United States Patent
Pollischansky et al.

(10) Patent No.: US 11,601,057 B2
(45) Date of Patent: Mar. 7, 2023

(54) SWITCHED-MODE POWER SUPPLY HAVING A PLURALITY OF OUTPUT STAGES

(71) Applicant: ABL IP HOLDING LLC, Atlanta, GA (US)

(72) Inventors: Thomas Pollischansky, Munich (DE); Markus Heckmann, Munich (DE)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 16/122,934

(22) Filed: Sep. 6, 2018

(65) Prior Publication Data

US 2019/0074772 A1  Mar. 7, 2019

(30) Foreign Application Priority Data

Sep. 7, 2017 (DE) .................. 10 2017 215 736.4

(51) Int. Cl.
| | |
|---|---|
| *H02M 3/158* | (2006.01) |
| *H05B 45/3725* | (2020.01) |
| *H05B 45/375* | (2020.01) |
| *H05B 45/38* | (2020.01) |
| *H02M 1/08* | (2006.01) |
| *H05B 45/60* | (2022.01) |
| *H05B 45/39* | (2020.01) |

(52) U.S. Cl.
CPC ........... *H02M 3/1584* (2013.01); *H02M 1/08* (2013.01); *H05B 45/3725* (2020.01); *H05B 45/60* (2020.01); *H02M 3/1586* (2021.05); *H05B 45/375* (2020.01); *H05B 45/38* (2020.01); *H05B 45/39* (2020.01)

(58) Field of Classification Search
CPC ................. H02M 3/1584; H02M 1/08; H02M 2003/1586; H05B 33/0815
See application file for complete search history.

(56) References Cited

U.S. PATENT DOCUMENTS

| | | | |
|---|---|---|---|
| 9,837,906 B1 | 12/2017 | Childs et al. | |
| 2012/0306388 A1 | 12/2012 | Jang | |
| 2014/0070710 A1* | 3/2014 | Harris | H05B 45/38 |
| | | | 315/185 R |
| 2014/0253066 A1 | 9/2014 | Teh | |
| 2016/0212814 A1* | 7/2016 | Chen | H05B 45/375 |
| 2016/0276924 A1* | 9/2016 | Castelli | H02M 1/4225 |
| 2016/0344292 A1* | 11/2016 | Sonnaillon | H02M 1/36 |
| 2017/0085189 A1* | 3/2017 | Madsen | H02M 3/338 |

FOREIGN PATENT DOCUMENTS

| | | | |
|---|---|---|---|
| DE | 10 2012 104 732 A1 | 12/2012 | |
| EP | 2814300 A1 * | 12/2014 | ............. H05B 45/10 |

OTHER PUBLICATIONS

German Search Report based on 10 2017 215 736.4 (7 pages) dated Jul. 13, 2018 (for reference purpose only).

* cited by examiner

*Primary Examiner* — Renan Luque
(74) *Attorney, Agent, or Firm* — Kilpatrick Townsend & Stockton LLP

(57) ABSTRACT

In various embodiments, a switched-mode power supply is provided. The switched-mode power supply includes at least two output stages. Each output stage has a converter. A frequency of at least one of the output stages is modulated by way of a modulation unit configured to provide a modulation signal that is combined with a switching signal for driving a switching element of the converter of the at least one output stage.

15 Claims, 5 Drawing Sheets

… (1)

SWITCHED-MODE POWER SUPPLY HAVING A PLURALITY OF OUTPUT STAGES

CROSS-REFERENCE TO RELATED APPLICATION

This application claims priority to German Patent Application Serial No. 10 2017 215 736.4, which was filed Sep. 7, 2017, and is incorporated herein by reference in its entirety.

TECHNICAL FIELD

Various embodiments relate generally to a switched-mode power supply having a plurality of output stages.

BACKGROUND

In a switched-mode power supply having a plurality of similar output stages, undesired synchronization effects may occur between the output stages.

Such undesired synchronization may occur for example in the case of an LED driver having two buck output drivers. The cause of the synchronization is magnetic and/or capacitive coupling of the spatially close output stages. The phases and frequencies of the currents and voltages in the output stages converge with one another, which may lead to false output parameters or to fluctuations at the output. These fluctuations, in the case of the LED driver, may become visible in the emitted light as flicker that is able to be perceived in a disruptive manner.

A conventional way to avoid such disruptive synchronizations is to operate the individual output stages at significantly different frequencies, such that undesired synchronization is not able to occur on account of the frequency differences. However, specifically in the case of LED drivers, it is necessary for them to cover a large output current and voltage range. Therefore, it is not possible to prevent frequencies (or their integer multiples) from becoming very close to one another at certain operating points and thus resulting in the undesired synchronization effects.

SUMMARY

In various embodiments, a switched-mode power supply is provided. The switched-mode power supply includes at least two output stages. Each output stage has a converter. A frequency of at least one of the output stages is modulated by way of a modulation unit configured to provide a modulation signal that is combined with a switching signal for driving a switching element of the converter of the at least one output stage.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
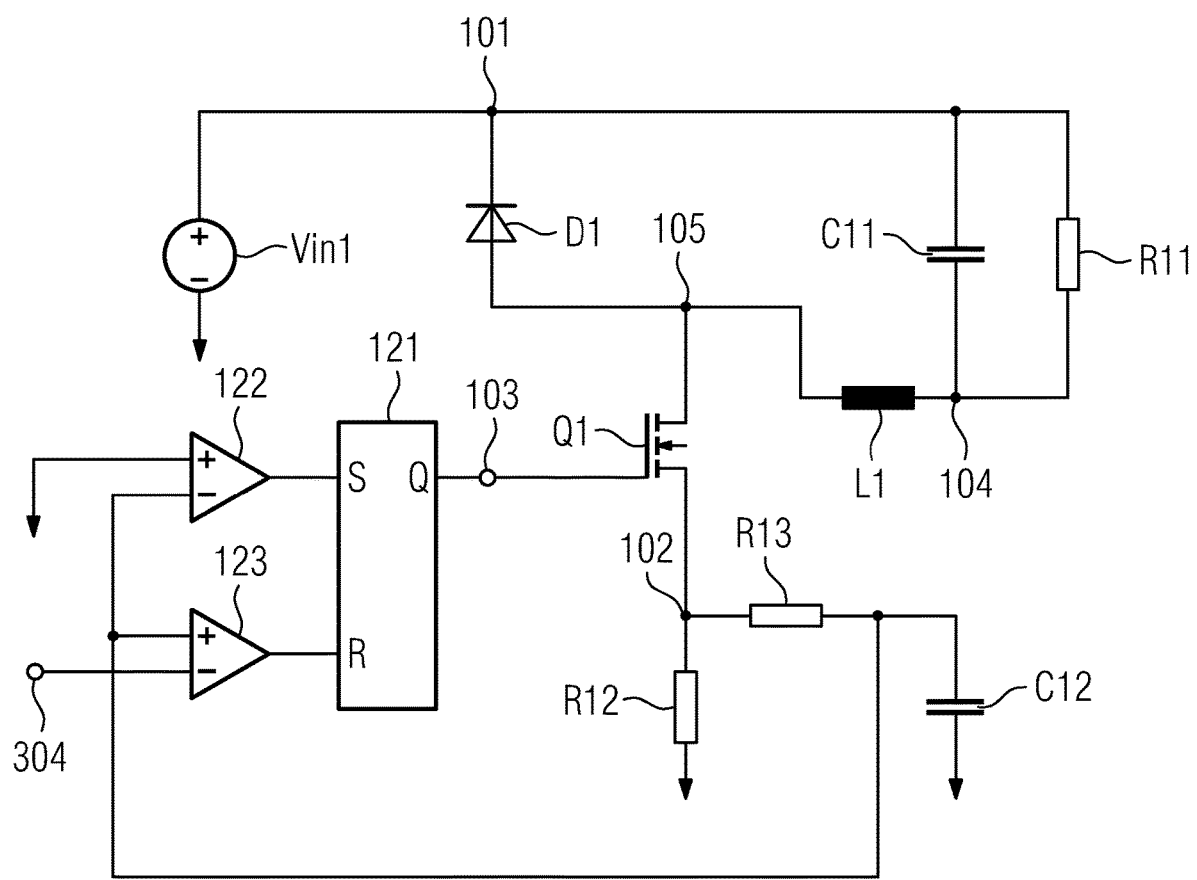
FIG. 1 shows a circuit diagram of a first buck stage.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments avoid the abovementioned disadvantages and may specify a solution that prevents or at least significantly reduces such undesired synchronization effects.

Various embodiments provide a switched-mode power supply having at least two output stages is specified,
    wherein each output stage has a converter,
    wherein a frequency of at least one of the output stages is modulated by way of a modulation unit, by the modulation unit providing a modulation signal that is combined with a switching signal for driving a switching element of the converter of the at least one output stage.

The modulation signal may be superimposed on the driving signal for the switching element, for example. One embodiment consists in the modulation signal being supplied to the driving signal via a node. Another variant consists in the modulation signal being supplied to one input of a flip-flop and the driving signal being supplied to the other input of the flip-flop, and the output of the flip-flop being connected to the gate terminal or the base of the switching element.

The switching element may be a transistor, for example a bipolar transistor or a MOSFET.

In one development, the converter is a step-up converter, a step-down converter or a combination of step-up converter and step-down converter.

In one development, each of the converters has at least one inductor, in each case at least two inductors of at least two output stages being coupled to one another.

Such coupling comes about for example as a result of the fact that the inductors (coils, chokes) are positioned so close to one another that their fields influence one another and, in the case of similar operating frequencies of the output stages coupled in this way, undesired synchronization effects therefore occur. This is able to be prevented or significantly reduced by the application, outlined here, of the modulation signal.

In one development, one modulated signal is provided per output stage and is combined with the switching signal for driving the switching element of this output stage.

In one development, the converters of the output stages are operated at least temporarily in a transition mode.

In one development,
    the switched-mode power supply has two output stages,
    the modulation unit provides a first modulation signal that
        is combined with the switching signal for driving the switching element of the converter of the first output stage, and the modulation unit or a further modulation unit provides a second modulation signal that is combined with the switching signal for driving the switching element of the converter of the second output stage.

In one development, the first modulation signal and the second modulation signal have a different phase angle.

In various embodiments, the first and the second modulation signal may be in phase opposition.

In one development, the first modulation signal and the second modulation signal have the same frequency or different frequencies.

In one development, the modulation signal is a triangular or a sawtooth-shaped signal.

In one development, the modulation signal is produced by way of a signal generator and of a low-pass filter.

By way of example, the signal generator may provide a square-wave signal (a pulse width-modulated (PWM) signal).

In one development, the modulation signal has a frequency that lies in a range between 1/100th and 1/5th of the frequency of the converter.

In one development, the switched-mode power supply may be used to drive at least one lighting means, e.g. at least one semiconductor lighting element.

By way of example, the switched-mode power supply may be part of an operating device for a lighting module. The lighting module may have light emitting diodes (LEDs) or organic light emitting diodes (OLEDs), for example.

Also proposed is a lighting unit having at least one switched-mode power supply as described herein.

In various embodiments, it is proposed to reduce or e.g. to completely (permanently) prevent undesired synchronization of the output stages by modulating the frequency of at least one output stage.

According to what is known as the Adler equation, the following holds true:

$$\frac{d\Delta\varphi}{dt} = \Delta\omega - \varepsilon \cdot \sin\Delta\varphi$$

where $\Delta\varphi$ is the difference in the phases of two oscillators, $\Delta\omega$ is the difference in the frequencies of two oscillators, $\varepsilon$ is the coupling of the oscillators.

If the term in the above Adler equation becomes equal to 0, then synchronization of the oscillators involved occurs. In various embodiments, it is proposed to prevent the term becoming 0, by the difference in the frequencies of the two oscillators $\Delta\omega$ being greater than their coupling E to one another.

If the frequency difference $\Delta\omega$ is not able to become 0 by modulating or by changing at least one of the frequencies involved, the phase difference $\Delta\varphi$ is also not able to become 0. Permanent (complete) synchronization is thus not able to occur.

FIG. 1 shows a circuit diagram of a buck stage (also known as a step-down converter).

A voltage source Vin1 delivers a voltage to a node 101. The node 101 is connected to a node 105 by way of a diode D1 whose cathode points in the direction of the node 101. The node 105 is connected to a node 104 by way of an inductor L1. A capacitor C11 is arranged between the node 101 and the node 104, and a resistor R11 is provided in parallel with the capacitor C11. The resistor R11 corresponds for example to an output load for the circuit shown here.

The node 105 is connected to the drain terminal of an n-channel MOSFET Q1. The gate terminal of the MOSFET Q1 is connected to a node 103. The source terminal of the MOSFET Q1 is connected to a node 102. A resistor R12 is arranged between the node 102 and ground. The node 102 is connected to ground by way of a series circuit consisting of a resistor R13 and a capacitor C12.

The voltage source Vin1 provides for example a voltage of a magnitude of 400 V. By way of example, the components that are shown may be dimensioned as follows: C11=0.2 µF, C12=1 nF, R11=2 kohms, R12=1 ohm, R13=1 kohm.

Figure 2:
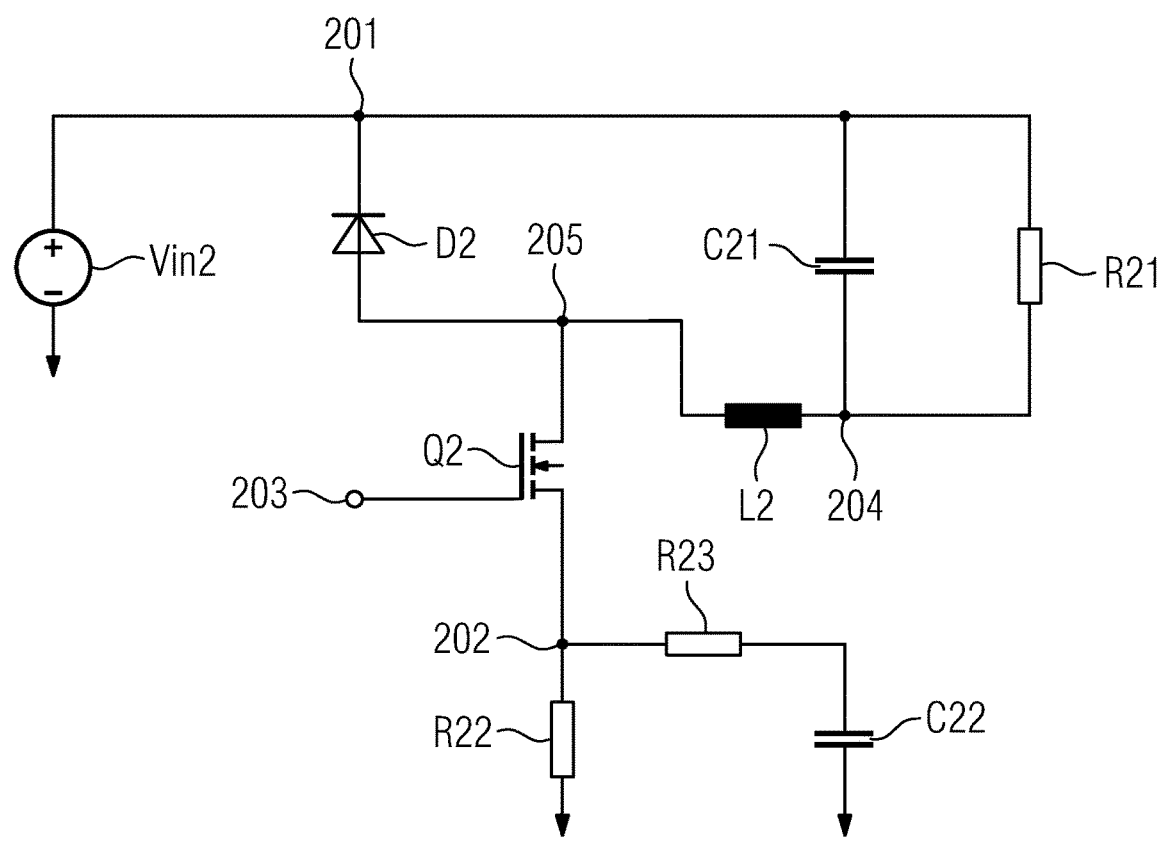
FIG. 2 shows a circuit diagram of a second buck stage.

FIG. 2 shows a circuit diagram of a buck stage that has substantially the same circuit topology as the circuit according to FIG. 1.

A voltage source Vin2 delivers a voltage to a node 201. The node 201 is connected to a node 205 by way of a diode D2 whose cathode points in the direction of the node 201. The node 205 is connected to a node 204 by way of an inductor L2. A capacitor C21 is arranged between the node 201 and the node 204, and a resistor R21 is provided in parallel with the capacitor C21. The resistor R21 corresponds for example to an output load for the circuit shown here.

The node 205 is connected to the drain terminal of an n-channel MOSFET Q2. The gate terminal of the MOSFET Q2 is connected to a node 203. The source terminal of the MOSFET Q2 is connected to a node 202. A resistor R22 is arranged between the node 202 and ground. A series circuit consisting of a resistor R23 and a capacitor C22 extends in parallel with the resistor R22.

The voltage source Vin2 provides for example a voltage of a magnitude of 400 V. By way of example, the components that are shown may be dimensioned as follows: C21=0.2 µF, C22=1 nF, R21=2 kohms, R22=1 ohm, R23=1 kohm.

The two buck stages according to FIG. 1 and FIG. 2 are operated for example in what is known as a transition mode. The buck stage according to FIG. 1 is operated in the transition mode via the node 103 by way of a controller (not shown) and the buck stage according to FIG. 2 is operated in the transition mode via the node 203 by way of possibly the same or a separate controller.

For the buck stage according to FIG. 1, the following holds true: When the MOSFET Q1 is switched on (by appropriate driving of its gate terminal), the inductor L1 is charged. If an appropriate current threshold is reached, the MOSFET Q1 is switched off and the current in the inductor L1 decreases again. If the inductor L1 is discharged, the MOSFET Q1 is switched on again.

The same holds true for the buck stage according to FIG. 2: When the MOSFET Q2 is switched on (by appropriate driving of its gate terminal), the inductor L2 is charged. If an appropriate current threshold is reached, the MOSFET Q2 is switched off and the current in the inductor L2 decreases again. If the inductor L2 is discharged, the MOSFET Q2 is switched on again.

As there is a small difference in the switching thresholds of the two buck stages, slightly different frequencies result for the buck stages shown in FIG. 1 and FIG. 2. By way of example, the current profile in the inductor L1 has a frequency of 45 kHz, and the current profile in the inductor L2 has a frequency of 47 kHz. These current profiles in the inductors L1 and L2 adopt different in-phase and in-antiphase positions.

The two buck stages are coupled by way of the inductors L1 and L2. As a result, there is undesired synchronization of the profiles of the currents in the inductors L1 and L2, for example at a frequency of 37 kHz. In this case, the currents are in phase, and their phase difference remains less than 60°, for example.

This undesired synchronization may be prevented or at least significantly reduced by additionally applying a first modulated signal to the node 103 and/or a second modulated signal to the node 203. The first modulated signal is preferably different from the second modulated signal. Optionally, the first modulated signal and the second signal may have the same frequency but different phase angles.

The first modulated signal and/or the second modulated signal may for example each be produced using a triangular signal. By way of example, to this end, a square-wave signal may be integrated by way of an RC element.

Figure 3:
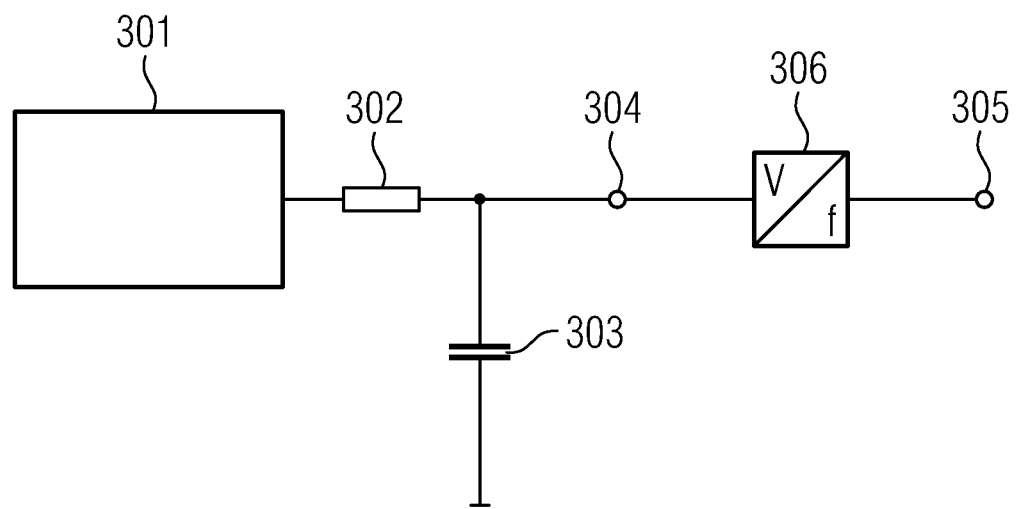
FIG. 3 shows an example of a circuit-based implementation for generating a modulated signal.

FIG. 3 shows an example of a circuit-based implementation for generating a modulated signal that is able to be applied to the node 103 or 203 as first or second modulated signal.

According to FIG. 3, a square-wave generator 301 (for example a PWM driver) produces a square-wave signal that is routed via a resistor 302 to an output 304. A capacitor 303 is arranged between the output 304 and ground. By way of example, a triangular signal or a signal with a profile similar to a triangular signal is then present at the output 304.

Optionally, a voltage-frequency converter 306 may be provided that connects the output 304 to an output 305. By way of example, the output 305 may be connected to the node 203.

The threshold for the current is changed on the basis of the first modulated signal, as a result of which the frequency of the signal generated by the buck stage is also changed. The first modulated signal preferably has a modulation that lies in a range between ¹⁄₁₀₀th and ⅕th of the frequency of the buck stage. As a result, it is possible to prevent or significantly reduce convergence of the phases between the buck stages, and thus synchronization of the two buck stages. By supplying the first modulated signal to the node 103, various in-phase and in-antiphase positions of the buck currents through the inductors L1 and L2 are thus produced.

To this end, the circuit shown in FIG. 1 may be supplemented by an RS flip-flop 121 and two comparators 122 and 123. The output 304 is connected to the negative input of the comparator 123. The positive input of the comparator 123 is connected to the negative input of the comparator 122, the positive input of the comparator 122 being grounded. The output of the comparator 122 is connected to the S-input of the RS flip-flop 121, and the output of the comparator 123 is connected to the R-input of the RS flip-flop 121. The Q-output of the RS flip-flop 121 is connected to the node 103. Furthermore, the connection of the positive input of the comparator 123 to the negative input of the comparator 122 is connected to a node between the resistor R13 and the capacitor C12. A corresponding supplementation may likewise be provided for the circuit shown in FIG. 2.

In various embodiments, there are two options for how a signal is able to be applied to the node 103: Either the output 304 is connected to the node 103 by way of this flip-flop circuit, or the output 305 is routed to the node 103 (without such a flip-flop circuit). These explanations apply in the same way for a signal to be applied to the node 203.

A modulated signal may also be applied to the two buck stages. Accordingly, by way of example, the output 305 of a first modulation circuit according to FIG. 3 is connected to the node 103 of the first buck stage according to FIG. 1, and the output 305 of a second modulation circuit according to FIG. 3 (that is to say the modulation circuit according to FIG. 3 is implemented twice) is connected to the node 203 of the second buck stage according to FIG. 2. In various embodiments, the first modulated signal and the second modulated signal are in phase opposition with respect to one another and have the same or different frequencies. As a result, synchronization of the currents flowing through the inductors L1 and L2 is able to be significantly reduced or prevented.

By way of example, the first modulated signal may be routed to the R-input of an RS flip-flop, and the control signal for operating the buck stage according to FIG. 1 is routed to the S-input of the RS flip-flop. The output (for example the Q-output) of the RS flip-flop is connected to the node 103.

Accordingly, the second modulated signal may be routed to the R-input of a further RS flip-flop, and the control signal for operating the buck stage according to FIG. 2 is routed to the S-input of this RS flip-flop. The output (for example the Q-output) of the RS flip-flop is connected to the node 203.

Figure 5:
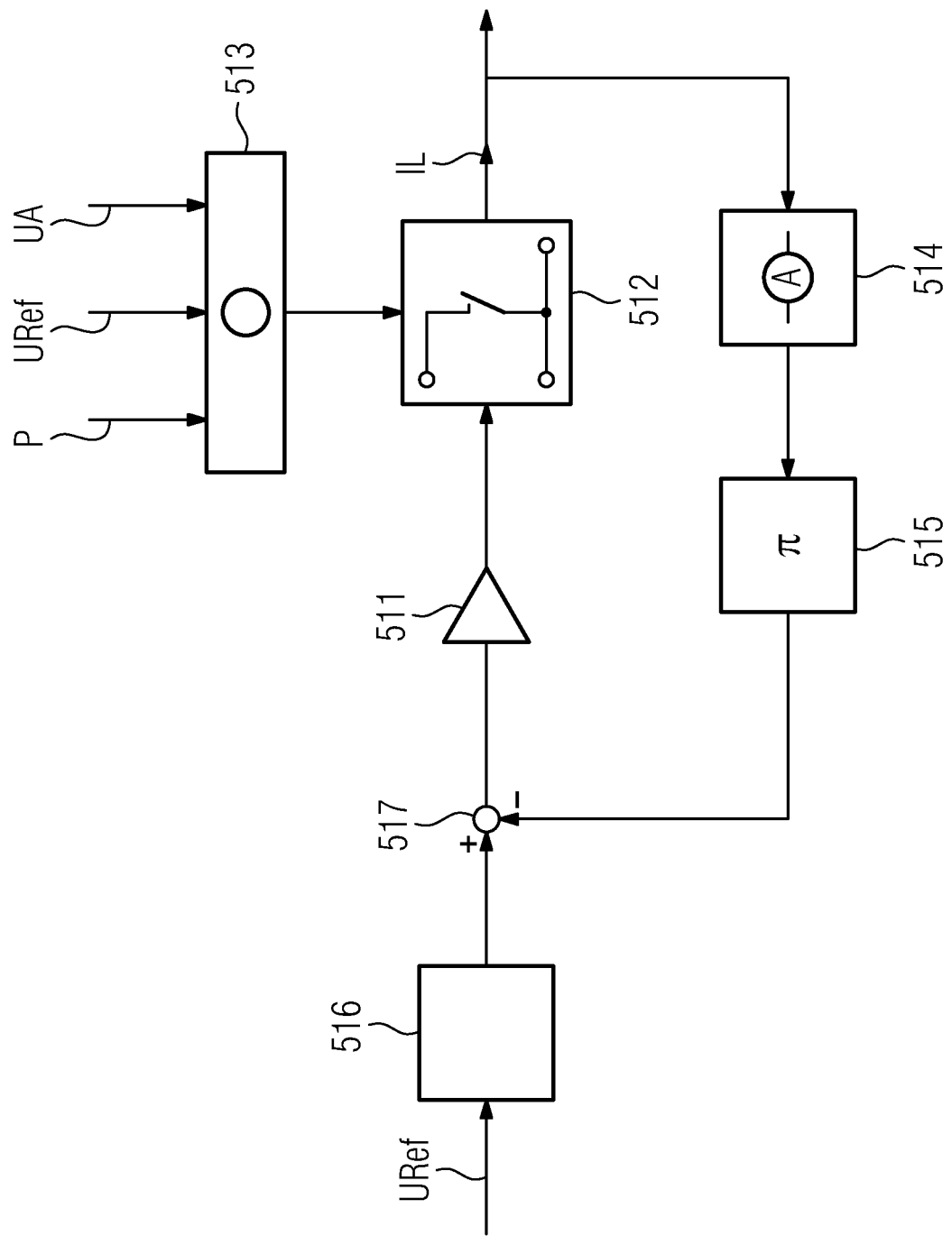
FIG. 5 shows a block diagram of a two-point controller that is able to operate a step-down converter with synchronous rectification with low losses and with optimized power output.

FIG. 5 shows a block diagram of a two-point controller that is able to operate a step-down converter with synchronous rectification with low losses and with optimized power output.

A current IL of a clocked converter is measured by a current measurement unit 514 and supplied to a comparison unit 517 via a filter 515. A voltage signal URef corresponding to the desired output current is input into the other input of the comparison unit 517 via a filter 516. The result is supplied to a control amplifier 511, which determines therefrom an upper threshold, the switch-off time of a first converter switch of a clocked converter 512, and supplies same thereto. A lower threshold, that is to say the switch-off time of a second converter switch, is determined by a module 513, which uses the power P and/or the voltage signal URef corresponding to the desired output current and/or an output voltage UA of the clocked converter to achieve this.

This control ensures setting of the desired output current IL, on the one hand, but in doing so likewise takes into account the characteristic of the clocked converter 512 by way of the module 513. Depending on the parameters taken into account by the clocked converter 512, the switch-on time of the first switch of the clocked converter 512 is determined following observation of a dead time for avoiding short circuits in the transistor bridge.

Expedient switching behavior of the converter transistor of the clocked converter is thus made possible over a wide output voltage range, the output current additionally being able to be set over a wide range. In the case of small output currents of the clocked converter 512, the lower threshold may be lower than in the case of larger output currents, for example. As a result, the frequency may be reduced in the case of smaller currents. In the case of high output currents, a higher lower threshold is selected in order to reduce losses in the components through additional reactive currents.

Figure 4:
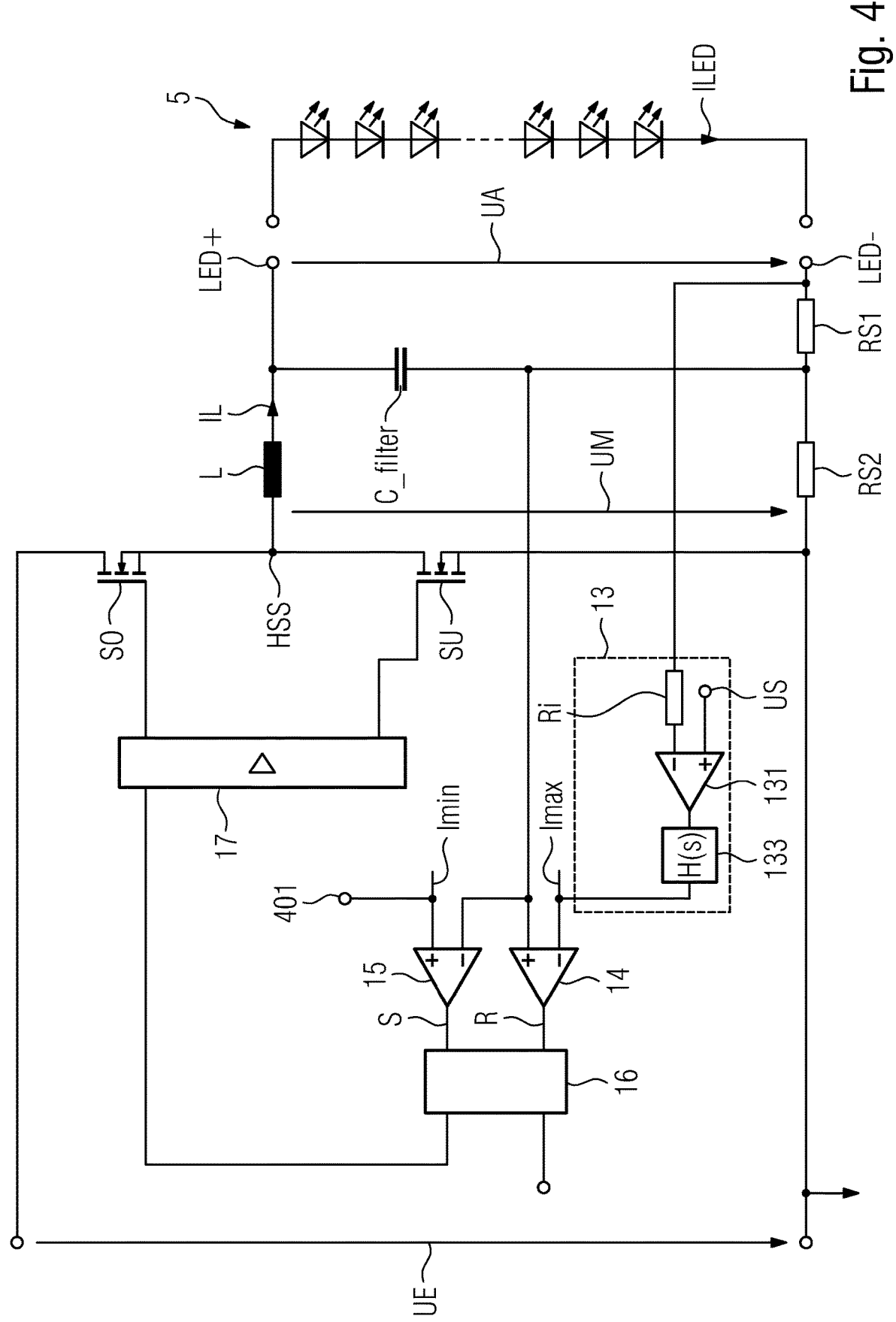
FIG. 4 shows a schematic circuit diagram of one embodiment of a step-down converter with synchronous rectification, with the option of applying a modulation signal.

FIG. 4 shows a schematic circuit diagram of one embodiment of a step-down converter with synchronous rectification. The converter is operated using a two-point controller, as shown for example in FIG. 5, the switch-off time of a transistor SU at around −0.5 A choke current (that is to say the current through the inductor L) being predefined, and the switch-off time of the transistor SO for the purpose of controlling the current of the connected LEDs 5 being variable.

The switch-off time of the upper switch determines the maximum current through the switch and the inductor L. This current is dimensioned such that the average current through the inductor L corresponds to the predefined current through the LEDs 5.

The current ILED through the LEDs 5 is acquired using two measurement resistors RS1 and RS2, the measurement resistor RS1 being optional. The voltage across the two measurement resistors RS1 and RS2 is supplied to a differential amplifier 13 with the transfer function H(s) 133, which amplifies the difference between a setpoint value US and the actual value provided by the measurement resistors RS1 and RS2. The output of the differential amplifier 13 defines a threshold value for the maximum current through the inductor L. The transfer function H(s) 133 may be dimensioned such that the control loop is stable. The output signal of the differential amplifier 13 with the transfer function H(s) 133 is supplied to the negative input of a comparator 14. The voltage dropping across the measurement resistor RS2 is supplied to the positive input, which voltage reflects the present current through the LEDs 5. The output of the comparator 14 is supplied to a reset input R of a flip-flop 16.

The voltage dropping across the measurement resistor RS2 is likewise supplied to a negative input of a comparator 15. The positive input of the comparator 15 is connected to a reference voltage (corresponding to the reference current Imin), which is a measure for the switch-off threshold of the transistor SU. By way of this voltage, the switch-off of the transistor SU is able to be set at a particular negative choke current.

A half-bridge driver circuit 17 ensures that a particular dead time between the switching procedures of the transistors SO and SU is observed, such that no short-circuit current is able to arise through the half bridge and also such that a complete commutation of the half bridge is performed before the respective transistor is switched on again.

Function of the Half-Bridge Driver Circuit

If the output signal Q of the flip-flop 16 jumps to High (logic 1 potential), the transistor SU is switched off. This is followed by the dead time, during which both transistors are switched off. After the dead time has elapsed, the transistor SO is switched on. If the output signal Q of the flip-flop 16 jumps back to Low (logic 0 potential), the transistor SO is switched off. This is again followed by the dead time, during which both transistors are switched off. After the dead time has elapsed, the transistor SU is switched on.

Function of the Circuit Shown in FIG. 4:

By amplifying the control deviation by way of the differential amplifier 13 with the transfer function H(s) 133, the threshold value for the comparator 14 is produced. The comparator 14 compares the present current value with the threshold value. This leads to a switch-off threshold of the transistor SO that corresponds to the desired current value through the LEDs 5. If the present current value exceeds the predefined setpoint value, the output of the comparator 14 goes to high and resets the flip-flop 16. The transistor SO is switched off. The current flows from the inductor L through the LEDs 5 via the stray output capacitance of the half bridge back to the inductor L and the half-bridge voltage UM oscillates at zero. The current then commutates to the freewheeling diode of the transistor SU. Shortly thereafter the dead time has elapsed and the transistor SU is switched on.

The present current value is input into the negative input of the comparator 15. The minimum current value Imin is input into the positive input as voltage, at which current value the transistor SU should switch off again. If the minimum current value is reached, the output of the comparator 15 switches to high and sets the flip-flop again. This switches off the transistor SU. The current then flows from the inductor L into the stray output capacitance of the half bridge, and the half-bridge voltage UM oscillates upwards to the value of the input voltage UE. The current then commutates to the freewheeling diode of the transistor SO. Shortly thereafter the dead time has elapsed and the transistor SO is switched on. As soon as the current through the inductor L has reached the peak value, the transistor SO switches off again and the cycle is repeated.

Preventing or Avoiding Synchronization:

By way of example, a modulated signal may be supplied to the positive input of the comparator 15 via a terminal 401. The reference signal Imin is thereby modulated.

In one embodiment, a modulated signal, as produced by the circuit shown in FIG. 3, may be routed to the terminal 401. The resulting modulated signal may be a square-wave signal. The differential amplifier 13 functions as a current controller and compensates the reference current Imax in such a way that the average output current remains the same and only the frequency changes.

As a result, undesired synchronization is effectively suppressed, or durations during which synchronization is visible are significantly reduced.

LIST OF REFERENCE SIGNS

101 Node
102 Node
103 Node
104 Node
105 Node
121 RS flip-flop
122 Comparator
123 Comparator
13 Differential amplifier
131 Operational amplifier
133 Transfer function H(s)
14 Comparator
15 Comparator
16 Flip-flop
17 Half-bridge driver circuit
201 Node
202 Node
203 Node
204 Node
205 Node
301 Square-wave generator
302 Resistor
303 Capacitor
304 Output
305 Output
306 Voltage-frequency converter
401 Terminal for a modulated signal
5 LEDs
511 Controller
512 Clocked converter
513 Module for determining switch-on time
514 Current measurement unit
515 Filter
516 Filter
517 Comparison unit C_filter Filter capacitor
C11 Capacitor
C12 Capacitor
C21 Capacitor
C22 Capacitor
D1 Diode
D2 Diode
ILED Current through the LEDs 5
Imax Reference current
Imin Reference current
L Inductor (converter choke)
L1 Inductor (coil, choke)
L2 Inductor (coil, choke)
P Power
Q1 n-channel MOSFET
Q2 n-channel MOSFET
R11 Resistor
R12 Resistor
R13 Resistor
R21 Resistor
R22 Resistor
R23 Resistor
Ri Internal resistance of the differential amplifier 13
RS1 Measurement resistor
RS2 Measurement resistor
SO (Upper) switching transistor
SU (Lower) switching transistor
UA Output voltage
UE Input voltage
UM Half-bridge voltage
URef Voltage signal (reference)
US Setpoint value
Vin1 Input voltage
Vin2 Input voltage While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A switched-mode power supply, comprising:
a first output stage and a second output stage;
wherein the first output stage comprises a first converter comprising a first switching element with either a first base terminal or a first gate terminal, and the second output stage comprises a second converter comprising a second switching element with a second base terminal or a second gate terminal;
wherein the first output stage comprises a first modulation unit and the second output stage comprises a second modulation unit;
wherein the first modulation unit is configured to modulate a frequency of the first output stage by providing a first modulation signal that is combined with a switching signal to the first base terminal or the first gate terminal for driving the first switching element;
wherein the second modulation unit is configured to modulate a frequency of the second output stage by providing a second modulation signal that is combined with a switching signal to the second base terminal or the second gate terminal for driving the second switching element;
wherein the first modulation signal and the second modulation signal are configured to cause the first output stage to operate asynchronously to the second output stage, wherein the second modulation signal is independent of the first modulation signal;
wherein a phase angle of the first modulation signal is different from a phase angle of the second modulation signal; and
wherein each of the converters has at least one inductor, the at least one inductor of each of the two output stages being coupled to one another.

2. The switched-mode power supply of claim 1,
wherein the converter is a step-up converter, a step-down converter or a combination of step-up converter and step-down converter.

3. The switched-mode power supply of claim 1,
wherein one modulated signal is provided per output stage and is combined with the switching signal for driving the switching element of a corresponding output stage.

4. The switched-mode power supply of claim 1, wherein the converters are operated in a transition mode.

5. The switched-mode power supply of claim 1,
wherein the switched-mode power supply has two output stages;
wherein the modulation unit provides a first modulation signal that is combined with the switching signal for driving the switching element of the converter of the first output stage; and
wherein the modulation unit or a further modulation unit provides a second modulation signal that is combined with the switching signal for driving the switching element of the converter of the second output stage.

6. The switched-mode power supply of claim 5,
wherein the first modulation signal and the second modulation signal have a different phase angle.

7. The switched-mode power supply of claim 5,
wherein the first modulation signal and the second modulation signal have the same frequency or different frequencies.

8. The switched-mode power supply of claim 1,
wherein the modulation signal is a triangular or a sawtooth-shaped signal.

9. The switched-mode power supply of claim 1,
wherein the modulation signal is generated by way of a signal generator and of a low-pass filter.

10. The switched-mode power supply of claim 1,
wherein the modulation signal has a frequency that lies in a range between 1/100th and 1/5th of the frequency of the converter.

11. The switched-mode power supply of claim 1, wherein combining the modulation signal with the switching signal comprises the modulation signal and the switching signal being on a common conductor.

12. A lighting unit, comprising:
at least one switched-mode power supply, comprising:
a first output stage and a second output stage;
wherein the first output stage comprises a first converter comprising a first switching element with either a first base terminal or a first gate terminal, and the second output stage comprises a second converter comprising a second switching element with a second base terminal or a second gate terminal;
wherein the first output stage comprises a first modulation unit and the second output stage comprises a second modulation unit;
wherein the first modulation unit is configured to modulate a frequency of the first output stage by providing a first modulation signal that is combined with a switching signal to the first base terminal or the first gate terminal for driving the first switching element;

wherein the second modulation unit is configured to modulate a frequency of the second output stage by providing a second modulation signal that is combined with a switching signal to the second base terminal or the second gate terminal for driving the second switching element;

wherein the first modulation signal and the second modulation signal are configured to cause the first output stage to operate asynchronously to the second output stage, wherein the second modulation signal is independent of the first modulation signal;

wherein a difference between the frequency of the first output stage and the frequency of the second output stage is not equal to zero, and wherein a phase angle of the first modulation signal is different from a phase angle of the second modulation signal.

13. A switched-mode power supply, comprising:

a first output stage and a second output stage;

wherein the first output stage has a first converter operating according to a first frequency and the second output stage has a second converter operating according to a second frequency;

wherein a difference between the first frequency and the second frequency is not equal to zero because the first and second frequencies of the first and second output stages are modulated by way of a modulation unit configured to provide a first modulation signal to the first converter that is combined with a switching signal for driving a first switching element of the first converter and a second modulation signal to the second converter that is combined with a switching signal for driving a second switching element of the second converter, and wherein the second modulation signal is independent of the first modulation signal, and wherein the first modulation signal and the second modulation signal are configured to cause the first and second output stages to operate asynchronously.

14. A switched-mode power supply, comprising:

at least two output stages;

at least two loads, each of the at least two loads driven by one of the at least two output stages;

wherein each output stage has a converter;

wherein a frequency of a first output stage of the at least two output stages is modulated by way of a modulation unit configured to provide a first modulation signal that is combined with a switching signal for driving a first switching element of a first converter of the first output stage, wherein a frequency of a second output stage of the at least two output stages is modulated by way of the modulation unit configured to provide a second modulation signal that is combined with a switching signal for driving a second switching element of a second converter of the second output stage, wherein the second modulation signal is independent of the first modulation signal, wherein the modulation signal is configured to cause the at least one of the output stages to operate asynchronously to the other of the output stages, and wherein each of the converters has at least one inductor, the at least one inductor of each of the two output stages being coupled to one another.

15. The switched-mode power supply of claim 14, wherein the at least two loads are resistive loads.

* * * * *